Patented June 25, 1935

2,006,023

UNITED STATES PATENT OFFICE 2,006,023

MEDICINAL PREPARATION

Fritz Lange and Ludwig Taub, Wuppertal-Elberfeld, Germany, assignors to Winthrop Chemical Company, Inc., New York, N. Y., a corporation of New York No Drawing. Application October 7, 1930, Serial No. 487,087. In Germany October 9, 1929

7 Claims. (Cl. 167—81)

The present invention relates to new medicinal preparations comprising a liquid containing vitamine B.

Preparations containing vitamine B are known in the art, for example in form of extracts of yeast. Object of our present invention is the provision of a medicinal preparation containing vitamine B in form of a palatable beverage.

In accordance with our invention such a beverage containing vitamine B is produced by fermentation of an extract containing vitamine B with the addition of fermentable types of sugars. It is a surprising fact that according to the biological tests after such a fermentation process the vitamine B present in the starting material is maintained unimpaired and in undiminished strength, since it appears from the literature that the same vitamine B which, for example, is obtained from rice polishings, is destroyed by fermentation (compare Biochemical Journal vol. 22, p. 1362 and seq.).

As starting materials containing vitamine B, for example, extracts or concentrates obtainable in the customary manner by autolysis of yeast or by extraction of yeast have proved useful. Preferably we start with a product which is obtained by first subjecting yeast to plasmolysis by addition of a fermentable sugar, for example, cane-, malt-, fruit- or grape-sugar, then separating the insoluble cell walls from the liquid produced and carefully concentrating the plasmolysate, for example, in such a degree that an extract containing 75% of sugar is obtained. The fermentation of such a concentrate can be effected by any, preferably strongly fermenting yeast, the kind of yeast depending on the aroma which is desired to be obtained in the product of manufacture. We prefer to employ a wine yeast, especially a south wine yeast such as sherry-, portwine-, malaga-, or Tokay-yeast or the like. The fermenting process is effected at a temperature between about 15–30° C., preferably at 30° C. and is finished when the formation of carbonic acid has stopped. In general, for the fermentation, a period of 2–3 weeks is required. The fermented product is after separating insoluble matter a clear liquid of south wine coloration and wine like taste and provides by its appetizing efficacy a palatable tonic and restorative of high therapeutical value which of course can be mixed with other suitable medicinal preparations.

Our invention is illustrated by the following example without being limited thereto:

To 400 parts by weight of a yeast extract containing vitamine B which is prepared by plasmolysis of pressed brewer's yeast with the same quantity of cane-sugar, separating the insoluble cell walls and carefully concentrating the liquid obtained up to a sugar content of about 75%, 600 parts by weight of water are added, and the mixture is fermented at about 30° C. after inoculating in the customary manner with a pure culture of a strongly fermenting south wine yeast. As soon as the evolution of carbon dioxide is complete which is the case after about 2–3 weeks, the fermented solution is with advantage situated in a cool place and the clear liquid which has a south wine like taste and coloration, is separated from the yeast. It appears established by animal experiments in the customary manner that the vitamine B effect of the fermented product corresponds qualitatively and quantitatively to that of the starting material.

We claim:

1. Medicinal preparations comprising a liquid containing vitamine B, prepared by fermentation of a yeast extract containing a fermentable sugar by means of a strongly fermenting yeast at a temperature between about 15–30° C., said liquids being clear solutions of south wine coloration, being palatable, therapeutically valuable tonics and restoratives.

2. Medicinal preparations comprising a liquid containing vitamine B, prepared by fermentation of a yeast plasmolysate by means of a strongly fermenting yeast at a temperature between about 15–30° C., which yeast plasmolysate has been obtained by plasmolyzing yeast in admixture with a fermentable sugar, said liquids being clear solutions of south wine coloration, being palatable, therapeutically valuable tonics and restoratives.

3. Medicinal preparations comprising a liquid containing vitamine B, prepared by fermentation of a yeast plasmolysate by means of a strongly fermenting yeast at a temperature between about 15–30° C., which yeast plasmolysate has been obtained by plasmolyzing yeast in admixture with cane sugar, said liquids being clear solutions of south wine coloration, being palatable, therapeutically valuable tonics and restoratives.

4. Medicinal preparations comprising a liquid containing vitamine B, prepared by fermentation of a yeast plasmolysate by means of a strongly fermenting south wine yeast at a temperature between about 15–30° C., which yeast plasmolysate has been obtained by plasmolyzing yeast in admixture with cane sugar, said liquids being clear solutions of south wine coloration, being palatable, therapeutically valuable tonics and restoratives.

5. Medicinal preparations comprising a liquid containing vitamine B, prepared by fermentation of a yeast plasmolysate by means of a south wine yeast of the group consisting of sherry-, portwine-, and Tokay-yeast at a temperature between about 15–30° C., which yeast plasmolysate has been obtained by plasmolyzing yeast in admixture with cane sugar, said liquids being clear solutions of south wine coloration, being palatable, therapeutically valuable tonics and restoratives.

6. Medicinal preparations comprising a liquid containing vitamine B, prepared by fermentation of a mixture of 400 parts by weight of a yeast plasmolysate containing 75% of cane-sugar, and 600 parts by weight of water by means of a south wine yeast of the group consisting of sherry-, portwine- and Tokay-yeast at a temperature between about 15–30° C., which yeast plasmolysate has been obtained by plasmolyzing yeast in admixture with cane sugar, said liquids being clear solutions of south wine coloration, being palatable, therapeutically valuable tonics and restoratives.

7. Medicinal preparations comprising a liquid containing vitamine B, prepared by fermentation of a mixture of 400 parts by weight of a yeast plasmolysate containing 75% of cane-sugar and 600 parts by weight of water by means of a south wine yeast of the group consisting of sherry-, portwine- and Tokay-yeast at a temperature of about 30° C. during 2–3 weeks, which yeast plasmolysate has been obtained by plasmolyzing yeast in admixture with cane sugar, said liquids being clear solutions of south wine coloration, being palatable, therapeutically valuable tonics and restoratives.

FRITZ LANGE.
LUDWIG TAUB.